(12) United States Patent
Huang et al.

(10) Patent No.: US 11,278,831 B2
(45) Date of Patent: Mar. 22, 2022

(54) FILTER ELEMENT ASSEMBLY AND WATER PURIFIER

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Xiao Huang, Zhuhai (CN); Jinjian Chen, Zhuhai (CN); Weijie Chen, Zhuhai (CN); Wei Gao, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 17/041,838

(22) PCT Filed: Nov. 2, 2018

(86) PCT No.: PCT/CN2018/113690
§ 371 (c)(1),
(2) Date: Sep. 25, 2020

(87) PCT Pub. No.: WO2019/227855
PCT Pub. Date: Dec. 5, 2019

(65) Prior Publication Data
US 2021/0077929 A1     Mar. 18, 2021

(30) Foreign Application Priority Data

May 28, 2018   (CN) .......................... 201810525419.7

(51) Int. Cl.
*B01D 29/11*      (2006.01)
*B01D 35/30*      (2006.01)
(Continued)

(52) U.S. Cl.
CPC ............ *B01D 35/306* (2013.01); *B01D 29/11* (2013.01); *B01D 35/1573* (2013.01);
(Continued)

(58) Field of Classification Search
CPC .. B01D 35/306; B01D 29/11; B01D 35/1573; B01D 2201/16; B01D 2201/304;
(Continued)

(56) References Cited

FOREIGN PATENT DOCUMENTS

| CN | 201154918 Y | 11/2008 |
|---|---|---|
| CN | 203598561 U | 5/2014 |

(Continued)

OTHER PUBLICATIONS

International Search Report for corresponding PCT/CN2018/113690 dated Mar. 6, 2019, 2 pages.

*Primary Examiner* — Waqaas Ali
(74) *Attorney, Agent, or Firm* — Armstrong Teasdale LLP

(57) ABSTRACT

The disclosure provides a filter element assembly and a water purifier. The filter element assembly includes a filter bottle, an interface mechanism and a connector. The interface mechanism is provided on the filter bottle; the connector is connected to the interface mechanism to form a water passage to communicate with the filter bottle; a blocking member is movably provided on a mechanism body and has a first position for closing the water passage and a second position for opening the water passage; a magnetic member is provided on the mechanism body and produces a magnetic force to the blocking member, for driving the blocking member to move towards the first position; the connector is inserted into the water passage to push the blocking member to the second position.

14 Claims, 7 Drawing Sheets

(51) Int. Cl.
*B01D 35/157* (2006.01)
*C02F 1/00* (2006.01)

(52) U.S. Cl.
CPC .......... *C02F 1/001* (2013.01); *B01D 2201/16* (2013.01); *B01D 2201/304* (2013.01); *B01D 2201/4069* (2013.01); *B01D 2201/4092* (2013.01); *C02F 2201/005* (2013.01)

(58) Field of Classification Search
CPC .... B01D 2201/4069; B01D 2201/4092; B01D 61/025; B01D 61/08; B01D 61/145; B01D 61/18; B01D 63/00; B01D 2201/30; C02F 1/001; C02F 2201/005; C02F 2201/006; C02F 2201/004; C02F 1/441; C02F 1/444
See application file for complete search history.

(56) References Cited

FOREIGN PATENT DOCUMENTS

| | | | |
|---|---|---|---|
| CN | 105715835 A | * | 6/2016 |
| CN | 106267954 A | | 1/2017 |
| CN | 107174951 A | | 9/2017 |
| CN | 206526593 U | | 9/2017 |
| CN | 206694716 U | | 12/2017 |
| CN | 206846045 U | | 1/2018 |
| CN | 107715557 A | | 2/2018 |
| CN | 108635948 A | | 10/2018 |
| WO | 2011009215 A1 | | 1/2011 |

\* cited by examiner

FILTER ELEMENT ASSEMBLY AND WATER PURIFIER

CROSS-REFERENCE TO RELATED APPLICATION

The disclosure is a National Stage application of PCT/CN2018/113690, filed Nov. 2, 2018, entitled "Filter Element Assembly and Water Purifier," which claims priority to Chinese patent application No. 201810525419.7, filed on May 28, 2018 and entitled "Filter element assembly and water purifier", the disclosure of which are hereby incorporated by reference in their entirety.

TECHNICAL FIELD

The disclosure relates to the technical field of water purifying devices, and in particular to a filter element assembly and a water purifier.

BACKGROUND

In a structure of a water purifier, a filter element device has a main filtering function. After the water purifier is used for a period of time, the filter element device needs to be replaced.

At present, when the filter element device in the market is replaced, water may be overflowed, user experience and after-sale service are affected. Especially in some water purifiers with inverted filter elements, if there is no operating experience, the inverted filter element may cause water to leak out of a whole machine during a removing process, and may cause serious abnormality of whole machine electric devices so that it may not be operated. Therefore, if the filter element needs to be replaced, a professional after-sale service person is usually required to come for disassembly and replacement, the filter element may not be automatically replaced by a user, thereby it brings great inconvenience to the replacement of the filter element of the water purifier.

SUMMARY

Some embodiments of the disclosure provide a filter element assembly and a water purifier, so as to solve a technical problem in an existing technology that a filter element device in the water purifier is inconveniently replaced.

Some embodiments of the disclosure provides a filter element assembly, including: a filter bottle; an interface mechanism, provided on the filter bottle; and a connector, connected with the interface mechanism to communicate with the filter bottle; the interface mechanism includes: a mechanism body, herein the mechanism body is provided with a water passage communicated with the filter bottle; a blocking member, moveably provided on the mechanism body, herein the blocking member has a first position for closing the water passage, and a second position for opening the water passage; and a magnetic member, provided on the mechanism body to produce a magnetic force to the blocking member, and configured to drive the blocking member to move towards the first position, herein the connector is inserted into the water passage to push the blocking member to the second position.

In some embodiments, the blocking member is provided in the water passage, the water passage is provided with a valve port matched with the blocking member, in the first position, the blocking member is abutted against the valve port.

In some embodiments, the valve port is a ring-shaped valve port, the blocking member is a spherical valve body cooperated with the ring-shaped valve port.

In some embodiments, there are multiple water passages, and there are multiple blocking members and magnetic members, each of the multiple blocking members is respectively provided in each of the multiple water passages, each of the multiple magnetic members is provided corresponding to each of the multiple blocking members, there are multiple connectors, each of the multiple connectors is provided corresponding to each of the multiple water passages.

In some embodiments, the mechanism body includes: a base, inserted in the filter bottle, herein a part of the water passage is formed on the base, and the blocking member is positioned on the base; and a pressing cover, covering the base, herein the other part of the water passage is formed on the pressing cover, the valve port is provided on the pressing cover, and the magnetic member is positioned on the pressing cover.

In some embodiments, a bottom of the water passage on the base is provided with an anti-off portion, the anti-off portion is configured to prevent the blocking member from being disconnected from a bottom of the water passage.

In some embodiments, a top of the pressing cover is provided with an interface, the interface is communicated with the water passage, and the interface is configured to plug-connect the connector.

In some embodiments, the filter element assembly includes a first sealing ring, the first sealing ring is provided between the base and the filter bottle.

In some embodiments, the mechanism body includes a second sealing ring, the second sealing ring is provided between the base and the pressing cover.

In some embodiments, the filter element assembly includes a third sealing ring, the third sealing ring is provided between the interface and the connector.

In some embodiments, the filter element assembly further includes a guide fixing sleeve, the connector is provided on the guide fixing sleeve, and the guide fixing sleeve is in thread-connection with the base.

In some embodiments, a guide plate is provided in the guide fixing sleeve, and the connector is provided on the guide plate.

In some embodiments, a convex portion for pushing the blocking member to move is formed on a bottom of the connector.

The disclosure further provides a water purifier, including a filter element assembly, the filter element assembly is the above filter element assembly.

In the above embodiments, when the filter bottle is installed, the filter bottle is connected with the connector through the interface mechanism. The connector is inserted into the water passage to push the blocking member to the second position and overcome the magnetic force, produced by the magnetic member, to the blocking member, at this moment the water passage is opened so that work of filtering water may be performed. When the filter bottle needs to be disassembled, the connector is pulled out from the water passage, at the same time, the magnetic member drives the blocking member to move towards the first position through the magnetic force, and the water passage is closed. In this way, when the filter bottle is disassembled, the water passage may be automatically cut off through the interface mechanism provided on the filter bottle, and water in the filter bottle is avoided from leaking. Therefore, it may be replaced by a customer oneself, a problem that a water leakage phenomenon happens to the water purifier in a replacement process of the filter element device is solved, product reliability is improved, and a potential safety hazard is effectively eliminated.

BRIEF DESCRIPTION OF THE DRAWINGS

The drawings forming a part of the disclosure are used to provide further understanding of the disclosure. Schematic embodiments and description thereof of the disclosure are used to explain the disclosure, and do not form improper limitation to the disclosure. In the drawings.

DETAILED DESCRIPTION OF THE EMBODIMENTS

In order to make purposes, technical schemes and advantages of the disclosure clearer, the disclosure is further described in detail below in combination with implementation modes and drawings. Herein, the exemplary implementation modes and description thereof of the disclosure are used to explain the disclosure, but not served as limitation to the disclosure.

Figure 1:
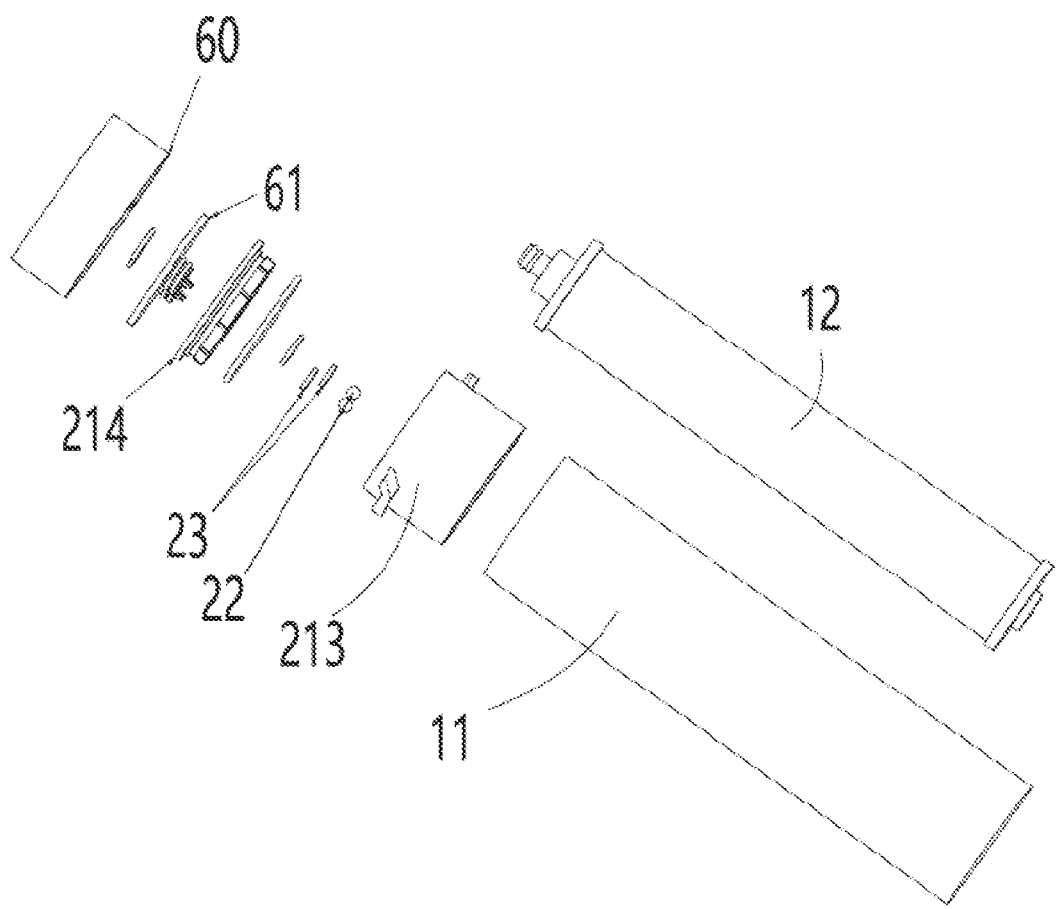
FIG. 1 is an exploded structure schematic diagram of an embodiment of a filter element assembly according to the disclosure.
Figure 2:
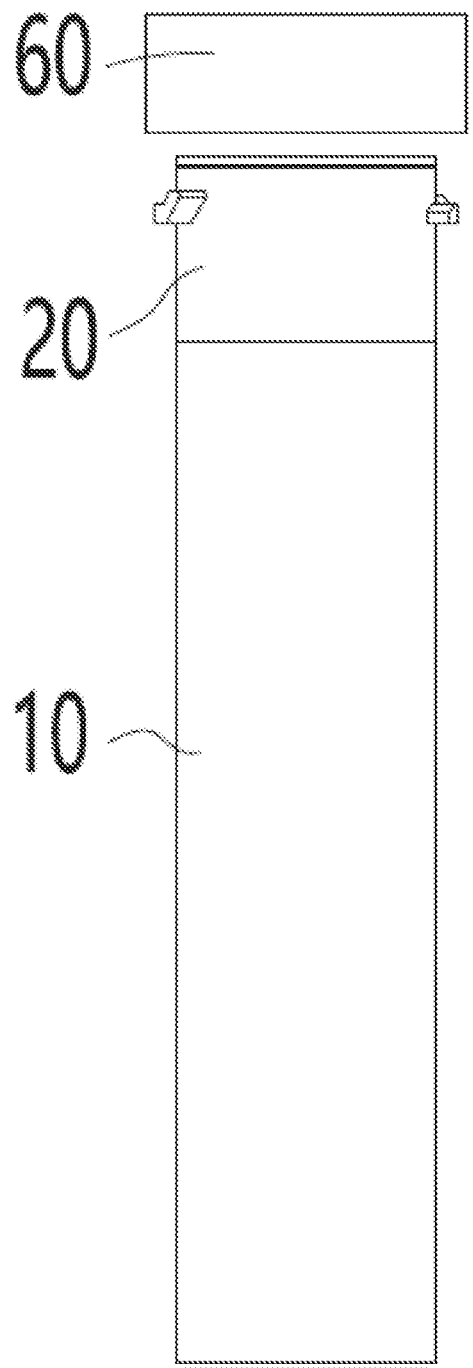
FIG. 2 is an overall structure schematic diagram of the embodiment of the filter element assembly according to the disclosure.
Figure 3:
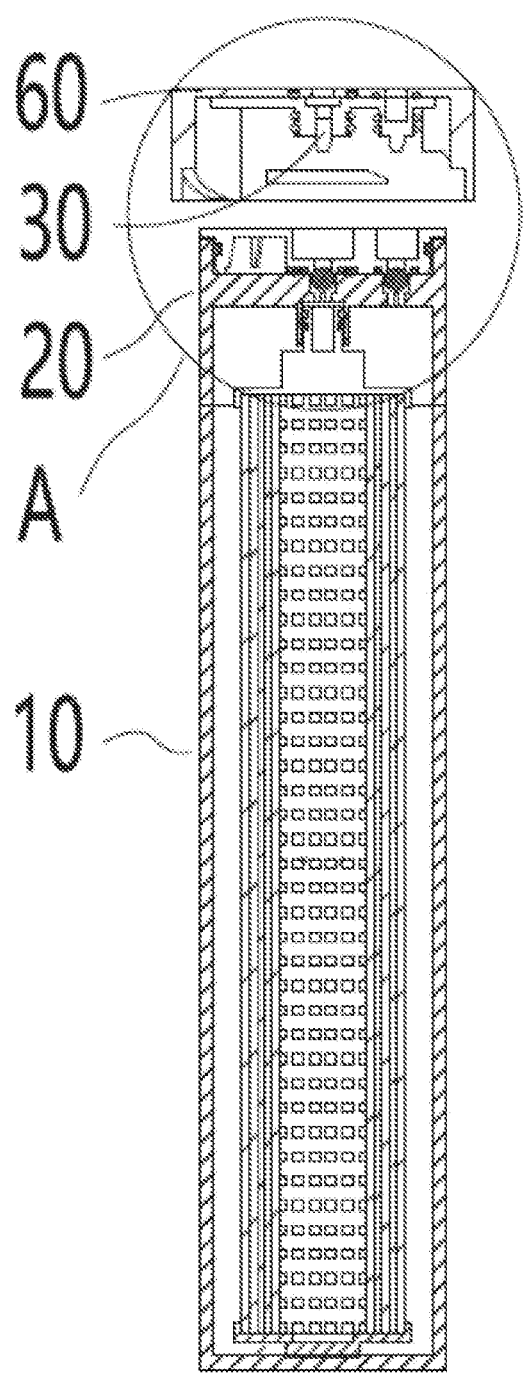
FIG. 3 is a section view structure schematic diagram of the filter element assembly in FIG. 2.

FIG. 1, FIG. 2 and FIG. 3 show an embodiment of a filter element assembly of the disclosure, the filter element assembly includes a filter bottle 10, an interface mechanism 20 and a connector 30. The interface mechanism 20 is provided on the filter bottle 10, and the connector 30 is connected to the interface mechanism 20 to communicate with the filter bottle 10. The interface mechanism 20 includes a mechanism body 21, a blocking member 22 and a magnetic member 23, the mechanism body 21 is provided with a water passage 211 communicated with the filter bottle 10, and the blocking member 22 is movably provided on the mechanism body 21. The blocking member 22 has a first position for closing the water passage 211, and a second position for opening the water passage 211. The magnetic member 23 is provided on the mechanism body 21 and produces a magnetic force to the blocking member 22, for driving the blocking member 22 to move towards the first position, the connector 30 is inserted into the water passage 211 to push the blocking member 22 to the second position.

The technical scheme of the disclosure is applied, when the filter bottle 10 is installed, the filter bottle 10 is connected with the connector 30 through the interface mechanism 20. The connector 30 is inserted into the water passage 211 to push the blocking member 22 to the second position and overcome the magnetic force, produced by the magnetic member 23, to the blocking member 22, at this moment the water passage is opened so that work of filtering water may be performed. When the filter bottle 10 needs to be disassembled, the connector 30 is pulled out from the water passage, at the same time, the magnetic member 23 drives the blocking member 22 to move towards the first position through the magnetic force, and the water passage is closed. In this way, when the filter bottle 10 is disassembled, the water passage may be automatically cut off through the interface mechanism 20 provided on the filter bottle 10, and water in the filter bottle 10 is avoided from leaking. Therefore, it may be replaced by a customer oneself, a problem that a water leakage phenomenon happens to the water purifier in a replacement process of the filter element device is solved, product reliability is improved, and a potential safety hazard is effectively eliminated.

Figure 4:
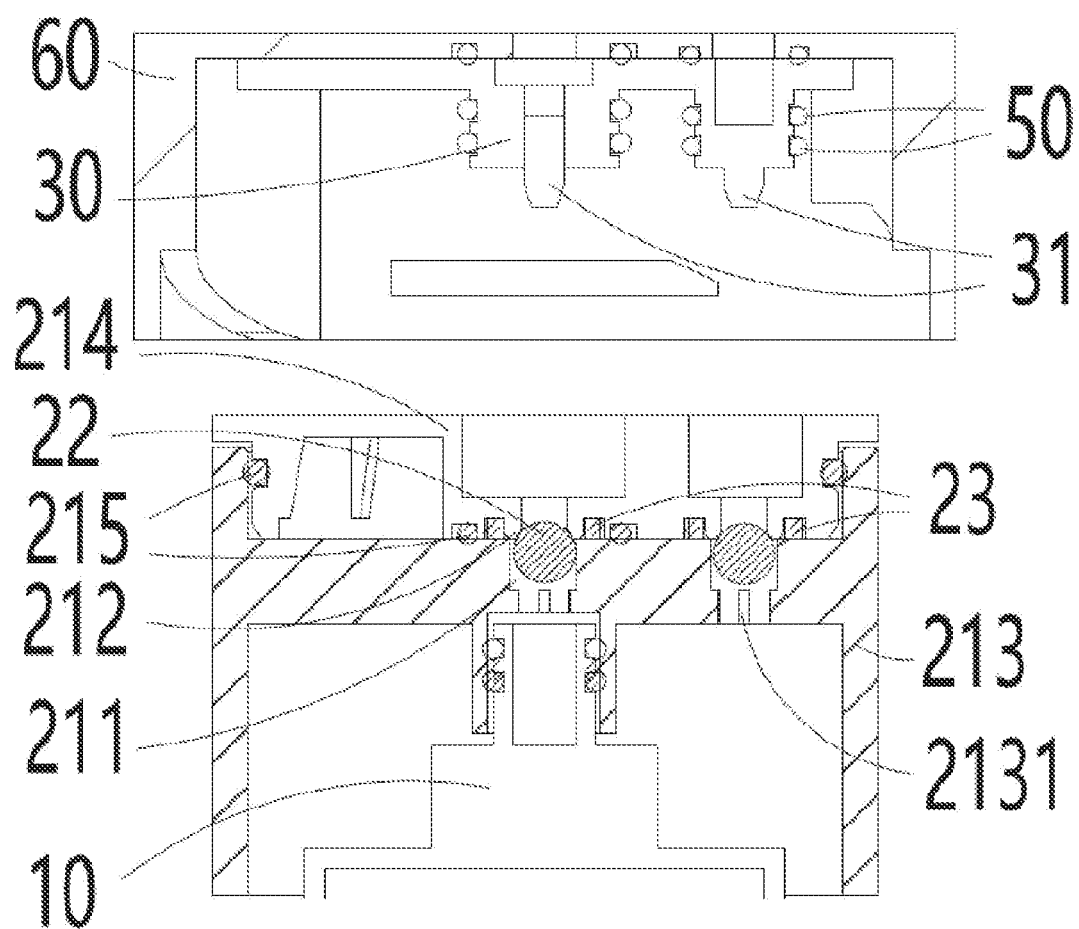
FIG. 4 is a local enlarged structure schematic diagram of the filter element assembly in FIG. 3.
Figure 5:
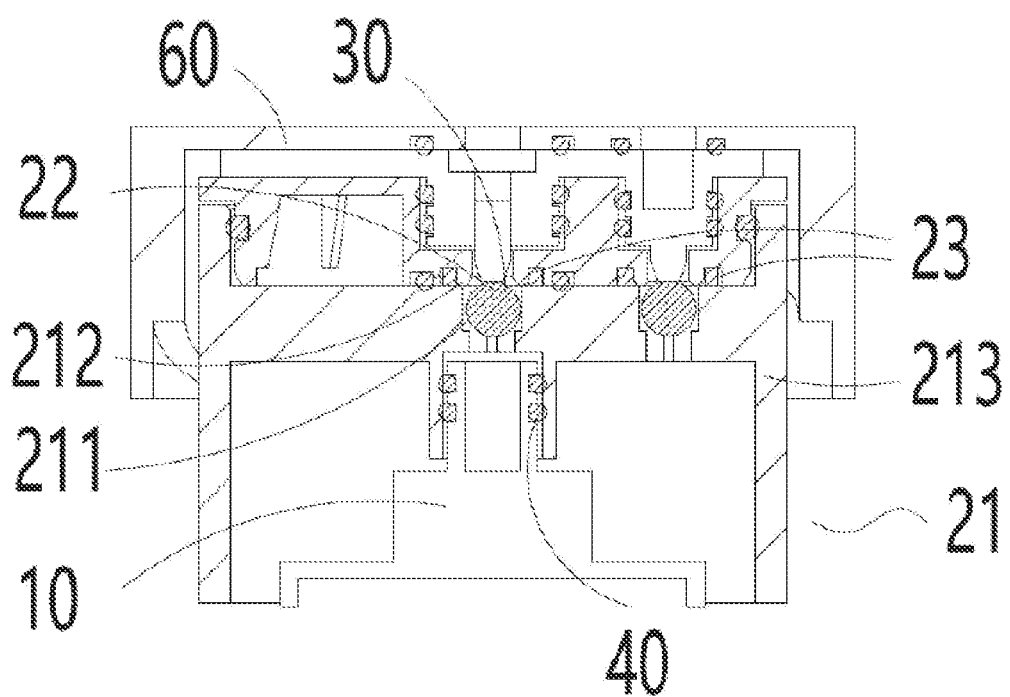
FIG. 5 is a structure schematic diagram of connection of a connector and an interface mechanism in FIG. 4.

As shown in FIG. 4 and FIG. 5, as one implementation mode, the blocking member 22 is provided in the water passage 211, the water passage 211 is provided with a valve port 212 matched with the blocking member 22, in the first position, the blocking member 22 is abutted against the valve port 212. When the filter bottle 10 is disassembled, the magnetic member 23 drives the blocking member to move towards the first position through the magnetic force and to be abutted against the valve port 212, so the water passage is closed.

As one optional implementation mode, in the technical scheme of the embodiments, the valve port 212 is a ring-shaped valve port, the blocking member 22 is a spherical valve body cooperated with the ring-shaped valve port. As other optional implementation modes, the valve port 212 may also be square, and the blocking member 22 corresponding to it is a cube or a cuboid type.

Optionally, there are multiple water passages 211, and there are multiple blocking members 22 and magnetic members 23, each of the multiple blocking members 22 is respectively provided in each of the multiple water passages 211, each of the multiple magnetic members 23 is provided corresponding to each of the multiple blocking members 22, there are multiple connectors 30, each of the multiple connectors 30 is provided corresponding to each of the multiple water passages 211. As shown in FIG. 4 and FIG. 5, in the technical scheme of the embodiments, there are two water passages 211, and there are two blocking members 22 and two magnetic members 23. Herein one water passage 211 is used for water inflow, and the other water passage 211 is used for water discharge.

Figure 6:
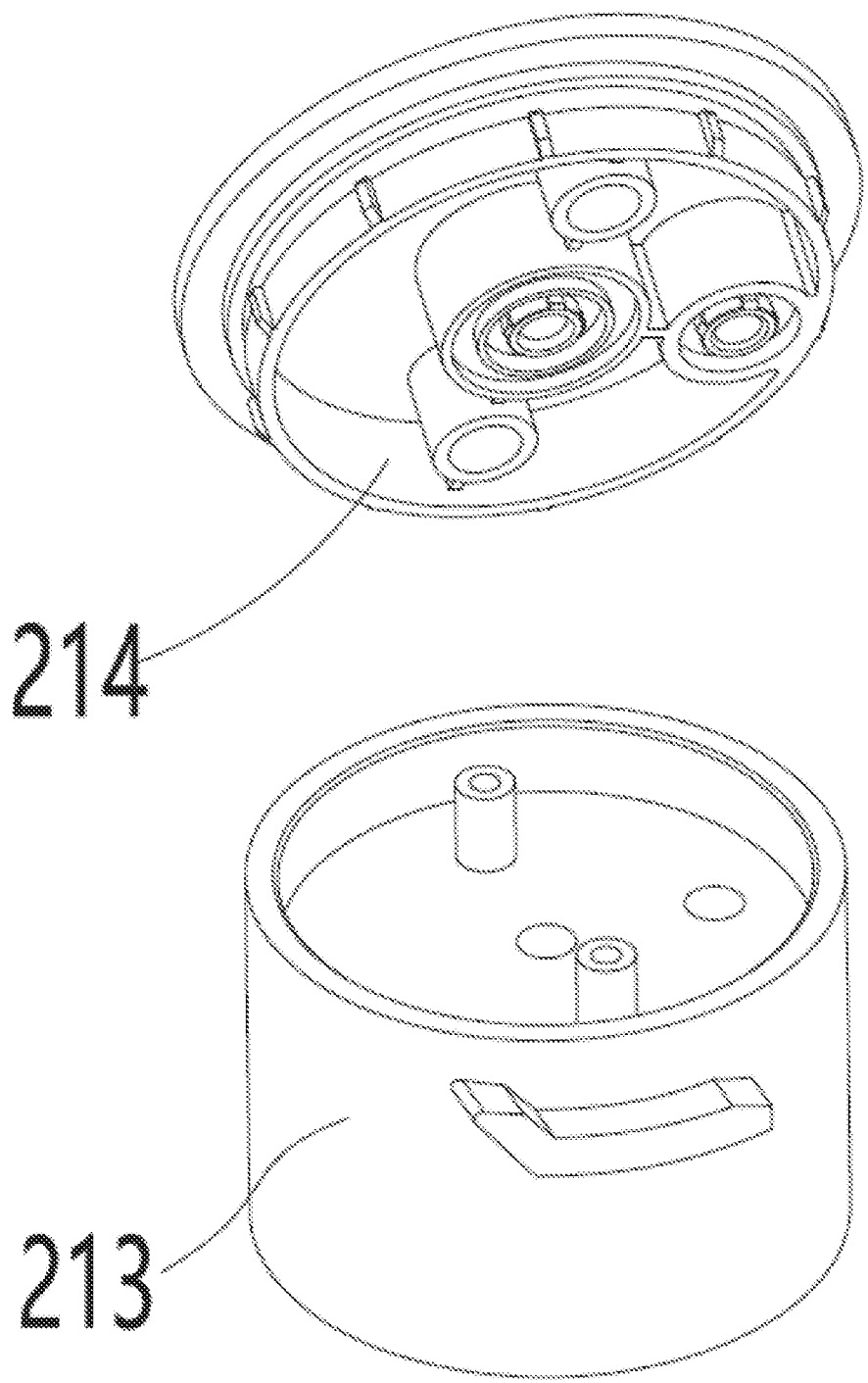
FIG. 6 is an exterior structure schematic diagram of the interface mechanism in FIG. 4.

As shown in FIG. 4 and FIG. 6, as one optional implementation mode, the mechanism body 21 includes a base 213 and a pressing cover 214, the base 213 is inserted in the filter bottle 10, a part of the water passage 211 is formed on the base 213, and the blocking member 22 is positioned on the base 213. The pressing cover 214 covers the base 213, the other part of the water passage 211 is formed on the pressing cover 214, the valve port 212 is provided on the pressing cover 214, and the magnetic member 23 is positioned on the pressing cover 214. The mechanism body 21 in the above structure is convenient for installing the magnetic member 23 and the blocking member 22. As shown in FIG. 6, a groove is formed in a position, adjacent to the water passage 211, of the bottom of the pressing cover 214, and the magnetic member 23 is installed in the groove. A top of the base 213 is provided with a bolt column, and the pressing cover 214 is in fit connection with the bolt column through a bolt.

As shown in FIG. 4, a top of the pressing cover 214 is provided with an interface, the interface is communicated with the water passage 211, the interface is configured to plug-connect the connector 30. Moreover, a convex portion 31 for pushing the blocking member 22 to move is formed on a bottom of the connector 30. After the connector 30 is inserted into the interface, the convex portion 31 is stretched into the water passage 211, and the blocking member 22 is separated from the valve port 212.

In order to prevent the blocking member 22 from departing from a magnetic force actuating range of the magnetic member 23 so as to fall, as shown in FIG. 4 and FIG. 5, a bottom of the water passage 211 on the base 213 is provided with an anti-off portion 2131, in this way, the anti-off portion 2131 may prevent the blocking member 22 from being disconnected from the bottom of the water passage 211.

As shown in FIG. 5, as one implementation mode, the filter element assembly includes a first sealing ring 40, and the first sealing ring 40 is provided between the base 213 and the filter bottle 10. The first sealing ring 40 is configured to seal a gap between the base 213 and the filter bottle 10, and prevent water leakage between the base 213 and the filter bottle 10.

In addition, the mechanism body 21 includes a second sealing ring 215, and the second sealing ring 215 is provided between the base 213 and the pressing cover 214. The second sealing ring 215 is configured to seal a gap between the base 213 and the pressing cover 214, and prevent water leakage between the base 213 and the pressing cover 214. Optionally, in the technical scheme of the embodiments, the pressing cover 214 is in plug-connection with a top of the base 213, the second sealing ring 215 is provided between the bottom of the pressing cover 214 and the bottom of the base 213, and the second sealing ring 215 is also provided between a side face of the pressing cover 214 and a side face of the base 213. Moreover, the second sealing ring 215 provided on the bottom of the pressing cover 214 is positioned in a position adjacent to the water passage 211.

Optionally, the pressing cover 214 is in fit connection with the base 213 through a mode of bolting or spin-melting welding.

As shown in FIG. 4, moreover, the filter element assembly includes a third sealing ring 50, and the third sealing ring 50 is provided between the interface and the connector 30. The third sealing ring 50 is configured to seal a gap between the interface and the connector 30, and prevent water leakage between the interface and the connector 30.

Figure 7:
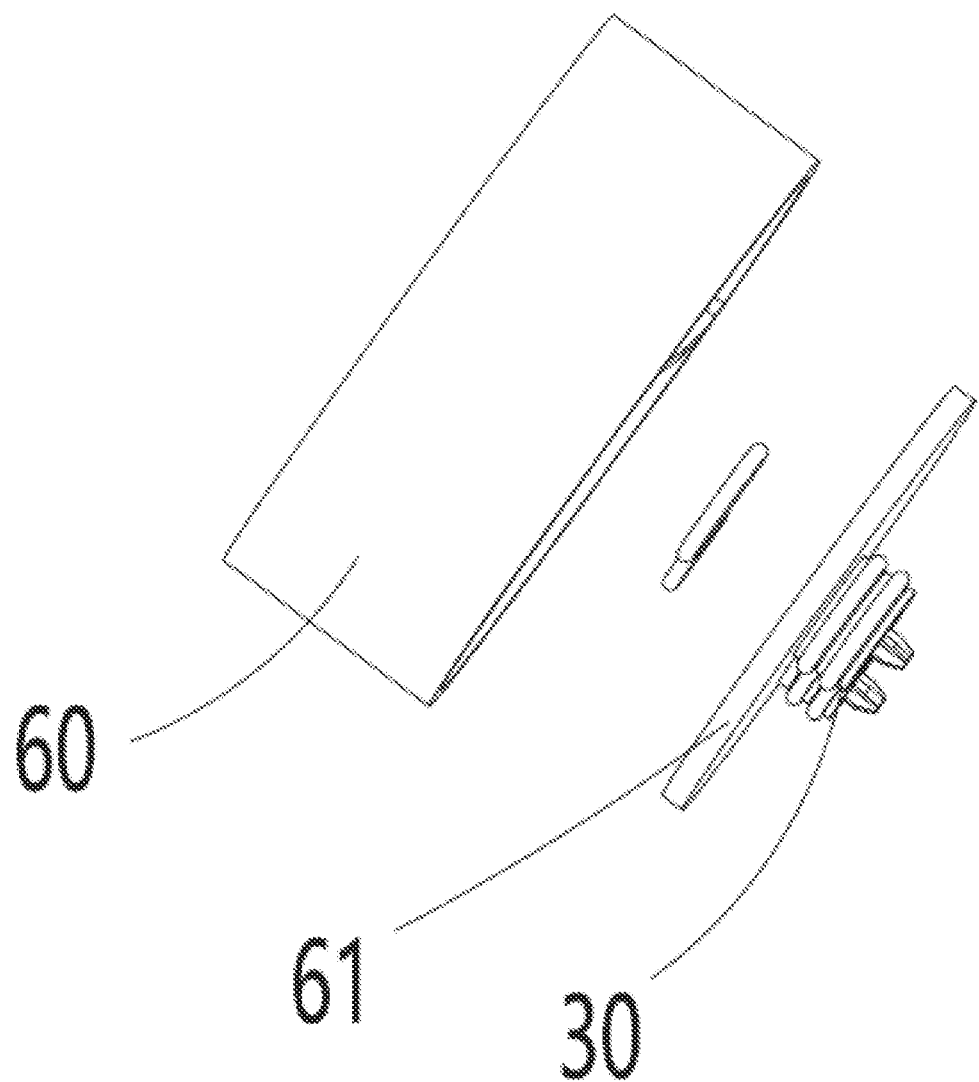
FIG. 7 is an exterior structure schematic diagram of a guide fixing sleeve in FIG. 4.

As shown in FIG. 7, in the technical scheme of the embodiments, the filter element assembly further includes a guide fixing sleeve 60, the connector 30 is provided on the guide fixing sleeve 60, and the guide fixing sleeve 60 is in thread-connection with the base 213. Through the connection between the guide fixing sleeve 60 and the base 213, connection between the connector 30 and the interface mechanism 20 may be stably achieved. Optionally, a section of a male thread is formed on the base 213, and a section of a female thread is also formed on the guide fixing sleeve 60. Optionally, a guide plate 61 is provided in the guide fixing sleeve 60, and the connector 30 is provided on the guide plate 61. Moreover, the sealing ring is also provided between the guide plate 61 and the guide fixing sleeve 60.

Optionally, in the technical scheme of the disclosure, the filter bottle 10 is made of a food-grade material. As shown in FIG. 1, the filter bottle 10 consists of a filter bottle housing 11 and a filter element 12. Optionally, the filter element 12 may be a filter element for water treatment of Polypropylene (PP) cotton, composite, ultrafiltration, or a Reverse Osmosis (RO) membrane and the like.

The disclosure further provides a water purifier, and the water purifier includes the above filter element assembly. The water purifier using the above filter element assembly is capable of enabling a customer to replace the filter element by oneself, solving a problem that a water leakage phenomenon happens to the water purifier in a replacement process of the filter element device, improving product reliability, and effectively eliminating a potential safety hazard.

Optionally, in the technical scheme of the disclosure, the above connector 30 may be provided on a filter element base, matched with the filter element device, in the water purifier, or directly provided on a waterway plate matched with the filter element device.

The above are only the embodiments of the disclosure, and are not intended to limit the disclosure, various modifications and changes may be made to the embodiments of the disclosure by those skilled in the art. Any modifications, equivalent replacements, improvements and the like made within the spirit and principle of the disclosure shall be included in a scope of protection of the disclosure.

What is claimed is:

1. A filter element assembly, comprising:
   a filter bottle;
   an interface mechanism, provided on the filter bottle; and
   a connector, connected with the interface mechanism to communicate with the filter bottle;
   wherein the interface mechanism comprises:
   a mechanism body, wherein the mechanism body is provided with a water passage communicated with the filter bottle;
   a blocking member, moveably provided on the mechanism body, wherein the blocking member has a first position for closing the water passage, and a second position for opening the water passage; and
   a magnetic member, provided on the mechanism body to produce a magnetic force to the blocking member, and configured to drive the blocking member to move towards the first position, wherein the connector is inserted into the water passage to push the blocking member to the second position, the blocking member is provided in the water passage, the water passage is provided with a valve port matched with the blocking member, in the first position, the blocking member is abutted against the valve port, the mechanism body comprises:
   a base, inserted in the filter bottle, wherein a part of the water passage is formed on the base, and the blocking member is positioned on the base; and
   a pressing cover, covering the base, wherein the other part of the water passage is formed on the pressing cover, the valve port is provided on the pressing cover, and the magnetic member is positioned on the pressing cover.

2. The filter element assembly as claimed in claim 1, wherein the valve port is a ring-shaped valve port, the blocking member is a spherical valve body cooperated with the ring-shaped valve port.

3. The filter element assembly as claimed in claim 1, wherein there are multiple water passages, and there are multiple blocking members and multiple magnetic members, each of the multiple blocking members is respectively provided in each of the multiple water passages, each of the multiple magnetic members is provided corresponding to each of the multiple blocking members, there are multiple connectors, each of the multiple connectors is provided corresponding to each of the multiple water passages.

4. The filter element assembly as claimed in claim 1, wherein a bottom of the water passage on the base is provided with an anti-off portion, the anti-off portion is configured to prevent the blocking member from being disconnected from a bottom of the water passage.

5. The filter element assembly as claimed in claim 1, wherein a top of the pressing cover is provided with an interface, the interface is communicated with the water passage, and the interface is configured to plug-connect the connector.

6. The filter element assembly as claimed in claim 1, wherein the filter element assembly comprises a first sealing ring, the first sealing ring is provided between the base and the filter bottle.

7. The filter element assembly as claimed in claim 1, wherein the mechanism body comprises a second sealing ring, the second sealing ring is provided between the base and the pressing cover.

8. The filter element assembly as claimed in claim 5, wherein the filter element assembly comprises a third sealing ring, the third sealing ring is provided between the interface and the connector.

9. The filter element assembly as claimed in claim 1, wherein the filter element assembly further comprises a guide fixing sleeve, the connector is provided on the guide fixing sleeve, and the guide fixing sleeve is in thread-connection with the base.

10. The filter element assembly as claimed in claim 9, wherein a guide plate is provided in the guide fixing sleeve, and the connector is provided on the guide plate.

11. The filter element assembly as claimed in claim 1, wherein a convex portion for pushing the blocking member to move is formed on a bottom of the connector.

12. A water purifier, comprising a filter element assembly, wherein the filter element assembly is the filter element assembly as claimed in claim 1.

13. The filter element assembly water purifier as claimed in claim 12, wherein the valve port is a ring-shaped valve port, the blocking member is a spherical valve body cooperated with the ring-shaped valve port.

14. The filter element assembly water purifier as claimed in claim 12, wherein a bottom of the water passage on the base is provided with an anti-off portion, the anti-off portion is configured to prevent the blocking member from being disconnected from a bottom of the water passage.

* * * * *